United States Patent
Frankel et al.

(10) Patent No.: US 10,061,492 B2
(45) Date of Patent: Aug. 28, 2018

(54) PATH-LINKED VIEWPOINTS FROM POINT OF INTEREST

(71) Applicant: Microsoft Technology Licensing, LLC, Redmond, WA (US)

(72) Inventors: Charles Frankel, Denver, CO (US); David Buerer, Woodinville, WA (US); Duncan Lawler, Bothell, WA (US); Romualdo Impas, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 413 days.

(21) Appl. No.: 14/731,220

(22) Filed: Jun. 4, 2015

(65) Prior Publication Data
US 2016/0357410 A1 Dec. 8, 2016

(51) Int. Cl.
*G06F 3/048* (2013.01)
*G06F 3/0484* (2013.01)
(Continued)

(52) U.S. Cl.
CPC ...... *G06F 3/04845* (2013.01); *G06F 3/04815* (2013.01); *G06F 3/04842* (2013.01);
(Continued)

(58) Field of Classification Search
CPC .. G06F 3/0481; G06F 3/04815; G06F 3/0482; G06F 3/04845; G06F 17/30241;
(Continued)

(56) References Cited

U.S. PATENT DOCUMENTS

| 6,563,529 B1 | 5/2003 | Jongerius |
| 7,298,869 B1 | 11/2007 | Abernathy |

(Continued)

FOREIGN PATENT DOCUMENTS

CN 101726298 B 6/2011

OTHER PUBLICATIONS

ISA European Patent Office, International Search Report and Written Opinion Issued in PCT Application No. PCT/US2016/034913, dated Aug. 31, 2016, WIPO, 13 pages.
(Continued)

*Primary Examiner* — Claudia Dragoescu
(74) *Attorney, Agent, or Firm* — Alleman Hall Creasman & Tuttle LLP

(57) ABSTRACT

Various embodiments relating to displaying viewpoints from a point of interest are disclosed. One embodiment includes displaying an entry point that includes a link to a view of a three dimensional scene from a point of interest, receiving a selection of the entry point from the user, retrieving a predetermined path of a plurality of predetermined viewpoints located around the point of interest, displaying the view of the three dimensional scene, the view being a rendering of the three dimensional scene from a first predetermined viewpoint in the plurality of predetermined viewpoints, displaying an interaction interface including a control to scroll along the predetermined path to a next location on the predetermined path, receiving a selection of the control, and displaying a second view of the three dimensional scene, the second view being a rendering of the three dimensional scene from the next location.

18 Claims, 10 Drawing Sheets

(51) Int. Cl.
*G06T 19/00* (2011.01)
*G06F 3/0481* (2013.01)
*H04N 5/232* (2006.01)

(52) U.S. Cl.
CPC ....... *G06T 19/003* (2013.01); *H04N 5/23238* (2013.01); *G06T 2200/04* (2013.01); *G06T 2200/24* (2013.01); *G06T 2207/30181* (2013.01); *G06T 2215/16* (2013.01); *G06T 2219/028* (2013.01)

(58) Field of Classification Search
CPC ......... G06F 17/30247; G06F 17/30268; G06F 2203/04805; G06F 17/3087; G06F 17/30873; G06F 2216/07; G06T 11/203; G06T 11/206; G06T 15/00; G06T 15/20; G06T 17/05; G06T 19/00; G06T 19/003; G06T 2219/2016; H04N 5/232; H04N 5/23216; H04N 5/23229; H04N 5/23238; H04N 5/23293; H04N 5/272; H04N 5/77; H04N 7/181; H04N 21/2187; H04N 21/4524; H04N 21/8146; G06Q 10/02; G06Q 30/00; G06Q 30/02; G06Q 50/14; G06Q 50/16

See application file for complete search history.

(56) References Cited

U.S. PATENT DOCUMENTS

| | | | | |
|---|---|---|---|---|
| 7,933,395 | B1* | 4/2011 | Bailly | G06F 3/04815 379/201.04 |
| 8,514,266 | B2 | 8/2013 | Wilson et al. | |
| 8,593,506 | B2 | 11/2013 | Peleg et al. | |
| 8,907,968 | B2 | 12/2014 | Tanaka et al. | |
| 2002/0093541 | A1* | 7/2002 | Schileru-Key | G06F 3/04815 715/855 |
| 2003/0063133 | A1* | 4/2003 | Foote | G06F 3/04815 715/850 |
| 2007/0273758 | A1 | 11/2007 | Mendoza et al. | |
| 2009/0207170 | A1 | 8/2009 | Matsunaga | |
| 2012/0230550 | A1 | 9/2012 | Kraut | |
| 2015/0116360 | A1* | 4/2015 | Jones | G06T 11/60 345/634 |

OTHER PUBLICATIONS

Parrish, Robin, "How Apple Creates 3D Flyover Maps", Published on: Oct. 4, 2012 Available at: http://www.applegazette.com/apple-inc/how-apple-creates-3d-flyover-maps/.

Carr, Austin, "Microsoft's New 3-D Maps Boast 121 Trillion Pixels, 'Grand Theft Auto'—Size Range", Published on: Dec. 5, 2013. Available at: http://www.fastcompany.com/3022996/microsofts-new-3d-maps-boast-121-trillion-pixels-with-grand-theft-auto-size-range.

"Share the Map", Retrieved on: Mar. 23, 2015 Available at: https://support.google.com/maps/answer/144361?hl=en.

Reilly, Jill, "Google Street View takes to the Skies: Cameras Map the Stunning Views from Top of the World's Tallest Building", Published on: Aug. 2, 2013 Available at: http://get-fun-here.blogspot.in/2013/08/view-from-burj-khalifa.html.

"Features of our Drones", Retrieved on: Mar. 23, 2015 Available at: http://altigator.com/features-of-our-drones/.

Ahmad, et al., "Aerial Mapping using High Resolution Digital Camera and Unmanned Aerial Vehicle for Geographical Information System", In Proceedings of 6th International Colloquium on Signal Processing and Its Applications, May 21, 2010, pp. 201-206.

Simonite, Tom, "High-Resolution 3-D Scans Built from Drone Photos", Published on: Mar. 19, 2015 Available at: http://www.technologyreview.com/news/535596/high-resolution-3-d-scans-built-from-drone-photos/.

Kim, et al., "Airborne Simultaneous Localisation and Map Building", In Proceedings of IEEE International Conference on Robotics and Automation, vol. 1, Sep. 14, 2003, pp. 406-411.

Birch, Peter, "Take Flight through New 3D Cities on Google Earth for Android", Published: Jun. 27, 2012 Available at: http://google-latlong.blogspot.in/2012/06/take-flight-through-new-3d-cities-on.html.

"Evernote: Saving Google Street View Photos with Web Clipper", Published: Jul. 16, 2014 Available at: https://garthscaysbrook.com/evernote-saving-google-street-view-photos-with-web-clipper/.

Yang, Paul, "Helicopter View of your Driving Directions on Google Maps", Published on: Sep. 30, 2011 Available at: http://google-latlong.blogspot.in/2011/09/helicopter-view-of-your-driving.html.

"Technologies", Retrieved on: Mar. 23, 2015 Available at: http://altigator.com/technologies/.

"Static Maps API V2 Developer Guide", Published on: Nov. 5, 2015. Available at: https://developers.google.com/maps/documentation/staticmaps/index.

Abdel-Razzaq, Lauren, "Google Deal puts Michigan Tourism Attractions on Map", Published on: Mar. 23, 2015 Available at: http://www.veooz.com/news/KlnTwgX.html.

Jason, "Best Hidden New Features in iOS 8", Published on: Sep. 17, 2014 Available at: http://www.iphonehacks.com/2014/09/best-hidden-ios-8-features.html.

"360Cities", Retrieved on: Mar. 27, 2015 Available at: http://www.360cities.net/.

"International Preliminary Report on Patentability Issued in PCT Application No. PCT/US2016/034913", dated Aug. 16, 2017, 8 Pages.

* cited by examiner

PATH-LINKED VIEWPOINTS FROM POINT OF INTEREST

BACKGROUND

Recent innovations have increasingly allowed users to experience the real world through a digital medium. Generating panoramic images taken at well-known landmarks—such as the Eiffel Tower, Space Needle, and the Empire State building, and providing those images to users online, helps enable users to experience a view from these landmarks as if they were there. Prior approaches to providing online images from landmarks include non-curated crowdsourcing, which can suffer from quality and consistency of the captured images, as well as curated approaches, which involve curation of each individual landmark by sending photographers to the landmark itself to capture images that meet the curator's quality standards. Panoramic views uploaded via crowdsourcing can be taken from haphazard positions and orientations, and be of unappealing quality. While the images from curated sites may generally be of higher quality, the images from both curated sites and non-curated sites alike are only available for specific image-capture locations at which the photographer stood, and do not allow the user to view the landmark from any arbitrary location. Constraining the user to a single location at the landmark prevents freedom of movement, and therefore degrades the user's ability to experience the landmark as if they were there, in exactly the location that the user desires. As a consequence, the user may leave the viewing experience frustrated that a vantage point the user had hoped to access was not available for viewing.

SUMMARY

To address these issues a computing system and method are provided for displaying path-linked viewpoints from a point of interest. The computing device may comprise a display for displaying images to a user, a user input device that receives input from the user, and a processor configured to display an entry point that includes a link to a view of a three dimensional scene from a point of interest, receive, via the user input device, a selection of the entry point from the user, retrieve a predetermined path of a plurality of predetermined viewpoints located around the point of interest, display the view of the three dimensional scene, the view being a rendering of the three dimensional scene from a first predetermined viewpoint in the plurality of predetermined viewpoints, display an interaction interface including a control to scroll along the predetermined path to a next location on the predetermined path, receive, via the user input device, a selection of the control, and display a second view of the three dimensional scene, the second view being a rendering of the three dimensional scene from the next location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
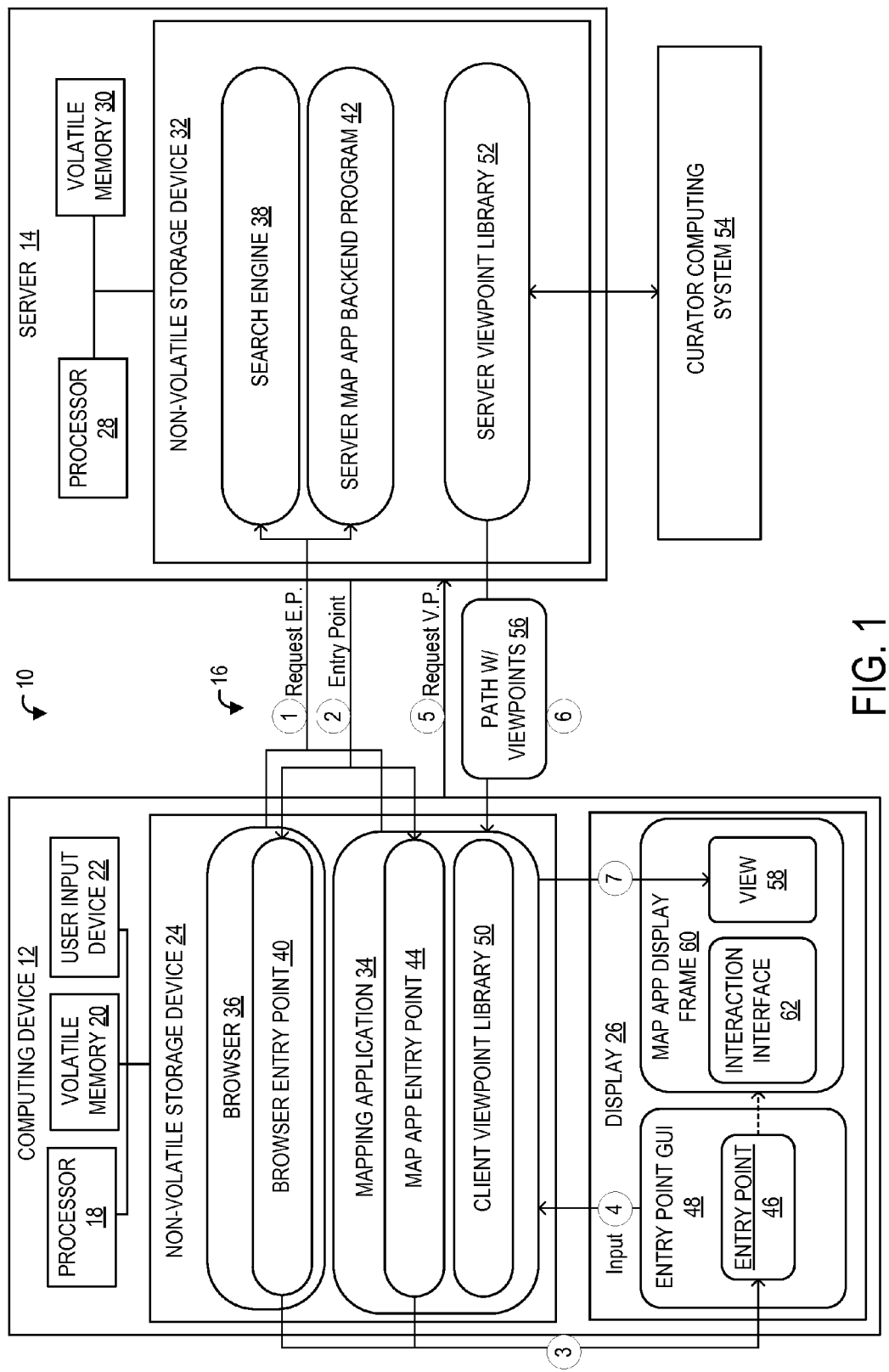
FIG. 1 shows a computing system for displaying path-linked viewpoints from a point of interest according to an embodiment of the present description.

FIG. 1 shows a computing system 10 for displaying path-linked viewpoints from a point of interest. Computing system 10 includes a computing device 12 of a user, and may also include server 14 that communicates with computing device 12 over a network 16. Computing device 12 may include a processor 18, volatile memory 20, a user input device 22, non-volatile storage device 24, and a display 26. Similarly, server 14 may include a processor 28, volatile memory 30, and non-volatile storage device 32. It will be appreciated that server 14 may be implemented on a server system that is distributed over multiple server devices, and may include displays, user input devices, and/or other components not displayed in FIG. 1.

The processor 18 of computing device 12 may be configured to execute a mapping application 34, which may be a three dimensional mapping application, configured to display path-linked viewpoints from a point of interest within the mapping application. To display the path-linked viewpoints from the point of interest, the computing device 12 may be configured to in a first step, (1) request an entry point to the path-linked viewpoints. This request may originate from either the mapping application 34 or a browser 36 executed on the computing device 12, or other suitable software program. In one specific example, where the request originates from the browser 36, the request may be a search request sent to a search engine 38 of the server 14. Accordingly in a second step, (2) the server 14 may return a browser entry point 40 as part of a search engine results page for the browser 36 of computing device 12 in response to the browser request in step (1). In another example, where the request originates from the mapping application 34, the request may be to a server mapping application backend program 42 of the server 14. Accordingly in the second step, (2) the server 14 may return a mapping application entry point in response to a mapping application request sent in step (1), which is displayed as mapping application entry point 44 in the mapping application 34 of computing device 12.

In a third step, (3) computing device 12 displays the entry point 46, which may be the browser entry point 40 or the mapping application entry point 44, via an entry point graphical user interface 48 presented on the display 26 of computing device 12. The entry point 46 includes a link to a view of a three dimensional scene from a point of interest in the three dimensional scene within the mapping application 34. At a fourth step, (4) the user selects the entry point 46 via the user input device 22. It will be appreciated that the user may select entry point 46 through a variety of input methods, such as clicking with a mouse, pressing a key on a keyboard, a voice command received by a microphone, or a gesture input tracked by a motion capture system as a few non-limiting examples.

Upon selection of the entry point 46 by the user, computing device 12 may determine whether the client viewpoint library 50 includes data for path-linked viewpoints that correspond to the entry point 46. For example, if the entry point 46 is a link to a view from the Space Needle, computing device 12 may determine whether client viewpoint library 50 contains data for path-linked viewpoints in a vicinity of the Space Needle. Upon determining that the client viewpoint library 50 does not contain suitable path-linked viewpoints, (5) computing device 12 may request suitable path-linked viewpoints from server 14 at the fifth step.

Upon receiving the request for suitable path-linked viewpoints from computing device 12, server 14 may retrieve suitable path-linked viewpoints from server viewpoint library 52. In one embodiment, the path-linked viewpoints are generated by a curator user with curator computing system 54. It will be appreciated that there may be any number of curator users generating path-linked viewpoints, and that curator computing system 54 may include any number of computing devices. The path-linked viewpoints generated by curator computing system 54 may be stored at the server viewpoint library 52 for retrieval by the server 14. Upon retrieving path-linked viewpoints 56, (6) server 14 may send the path-linked viewpoints 56 to computing device 12 in a sixth step.

Upon retrieving path-linked viewpoints 56 from client viewpoint library 50 or server 14, (7) computing device 12 may render a view 58 of a three dimensional scene from the perspective of the path-linked viewpoints 56 in a seventh step. The view 58 may be presented in a mapping application display frame 60 via the display 26 of computing device 12. Mapping application display frame 60 may also include an interaction interface 62 that includes controls that may be selected by the user, as explained in more detail below.

Figure 2:
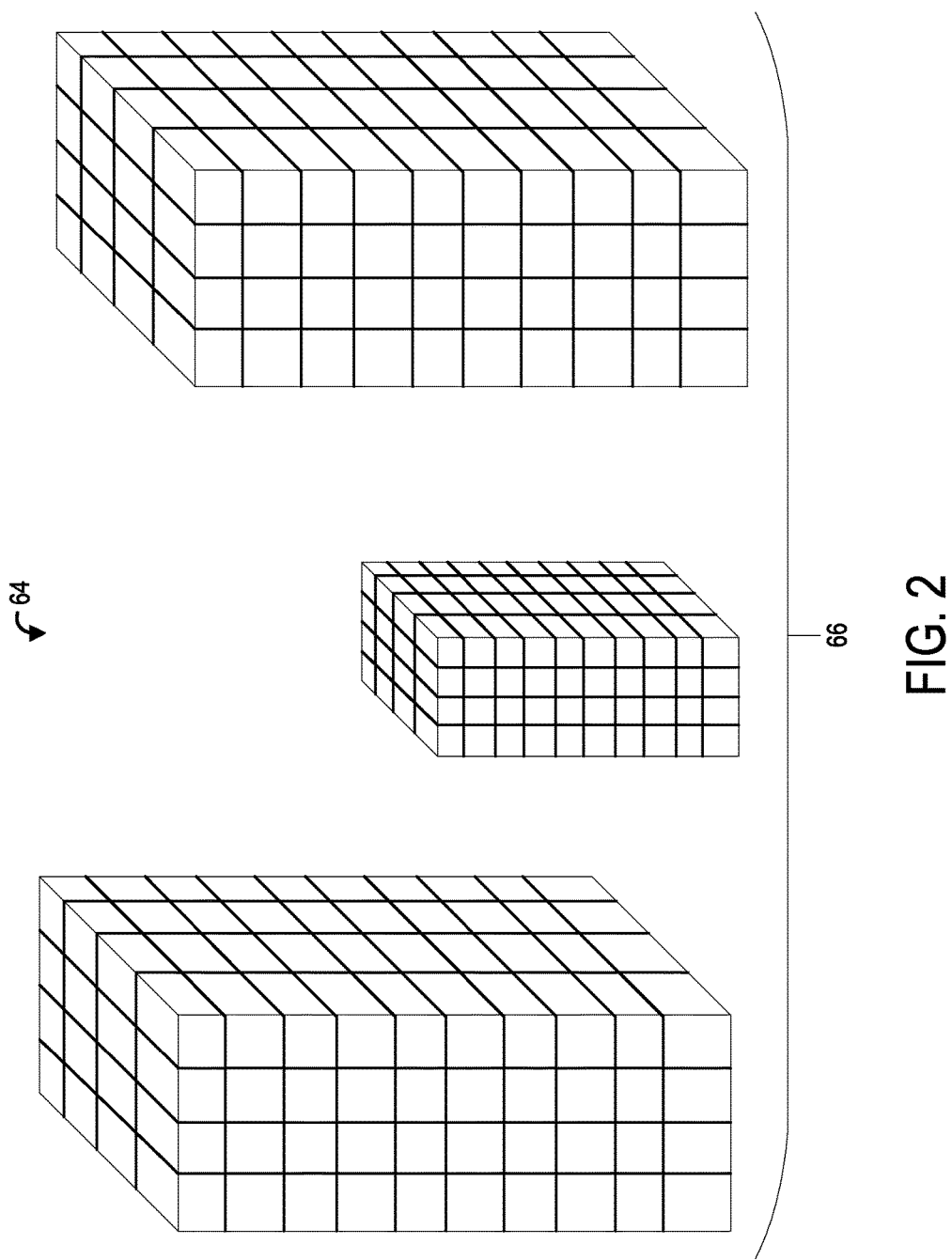
FIG. 2 shows a three dimensional scene that includes meshes for the mapping application of FIG. 1.

FIG. 2 illustrates an example three dimensional scene 64 that includes virtual objects 66, for mapping application 34. It will be appreciated that although three virtual objects with a cuboid shape are illustrated, the form of the virtual objects 66 may take any suitable shape and size, and the three dimensional scene 64 may include any number of these virtual objects. In one embodiment, the three dimensional scene is a virtual representation of a real world scene. For example, images of entire areas of interest may be captured by planes, drones, and/or satellites. Image analysis may then be performed on the captured images in order to generate a three dimensional scene that represents the entire area of interest, including virtual representations of the actual three dimensional objects in the area of interest, such that the entire area of interest may be virtually represented in mapping application 34. In one example, the area of interest may be a city such as Seattle, which includes a plurality of buildings and landmarks such as the Space Needle. After performing image analysis on the captured images of Seattle, a three dimensional scene of Seattle may be generated, including virtual representations of each building and landmark within Seattle. As shown in the example illustrated in FIG. 2, the buildings in the area of interest may be represented by the virtual objects 66, which include a mesh that generally conforms to the shape of the buildings in the real world area of interest. Further image analysis may then be performed on the captured images to generate visuals that are overlaid on the meshes of the virtual objects 66.

Figure 3:
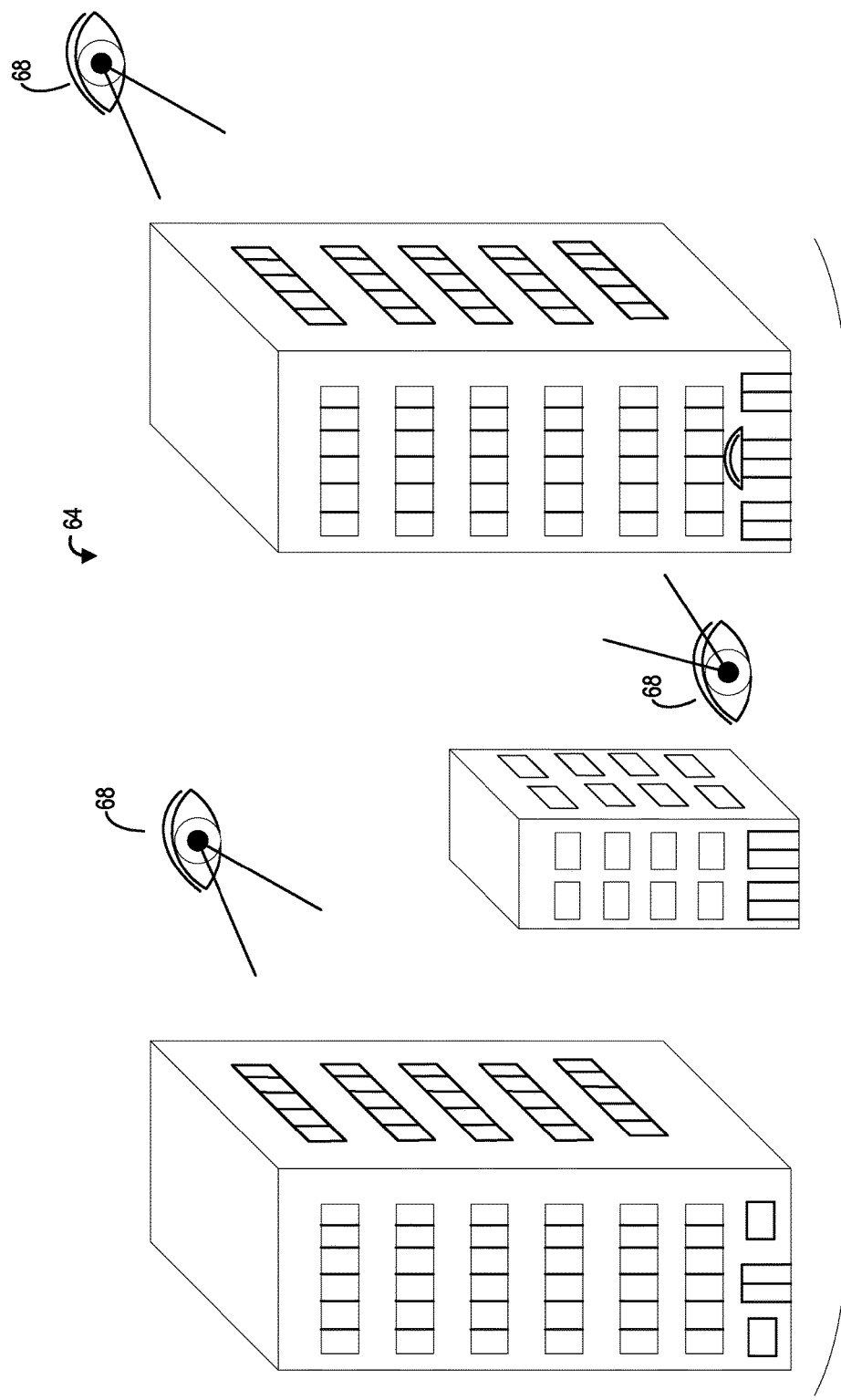
FIG. 3 shows a three dimensional scene that includes visual imagery overlaid on the meshes of FIG. 2.

FIG. 3 illustrates an example that includes visual imagery that is overlaid on top of the meshes of the virtual objects 66 in the three dimensional scene 64. In this example, the virtual objects 66 are representations of three buildings in a real world area of interest. The visual imagery of the outside of the buildings in the real world area of interest is captured in the images taken by the flying plane. The visual imagery of the outside of the buildings is then overlaid onto the corresponding meshes of the virtual objects 66. Through this method, a virtual three dimensional scene 64 may be generated that corresponds to the real world area of interest. Within the three dimensional scene, novel viewpoints 68 may be rendered from any arbitrary location and orientation, the novel viewpoints 68 illustrated in FIG. 3 being a few examples. Typically the data representing the three dimensional scene 64 is downloaded from server 14 to computing device 12 either prior to rendering time or in real time, and views of the three dimensional scene are rendered by a rendering engine executed in computer device 12. Optionally or additionally, a portion of or all of the data representing the three dimensional scene 64 may be stored on the non-volatile storage device 24 of computing device 12 as part of the mapping application 34.

Figure 4:
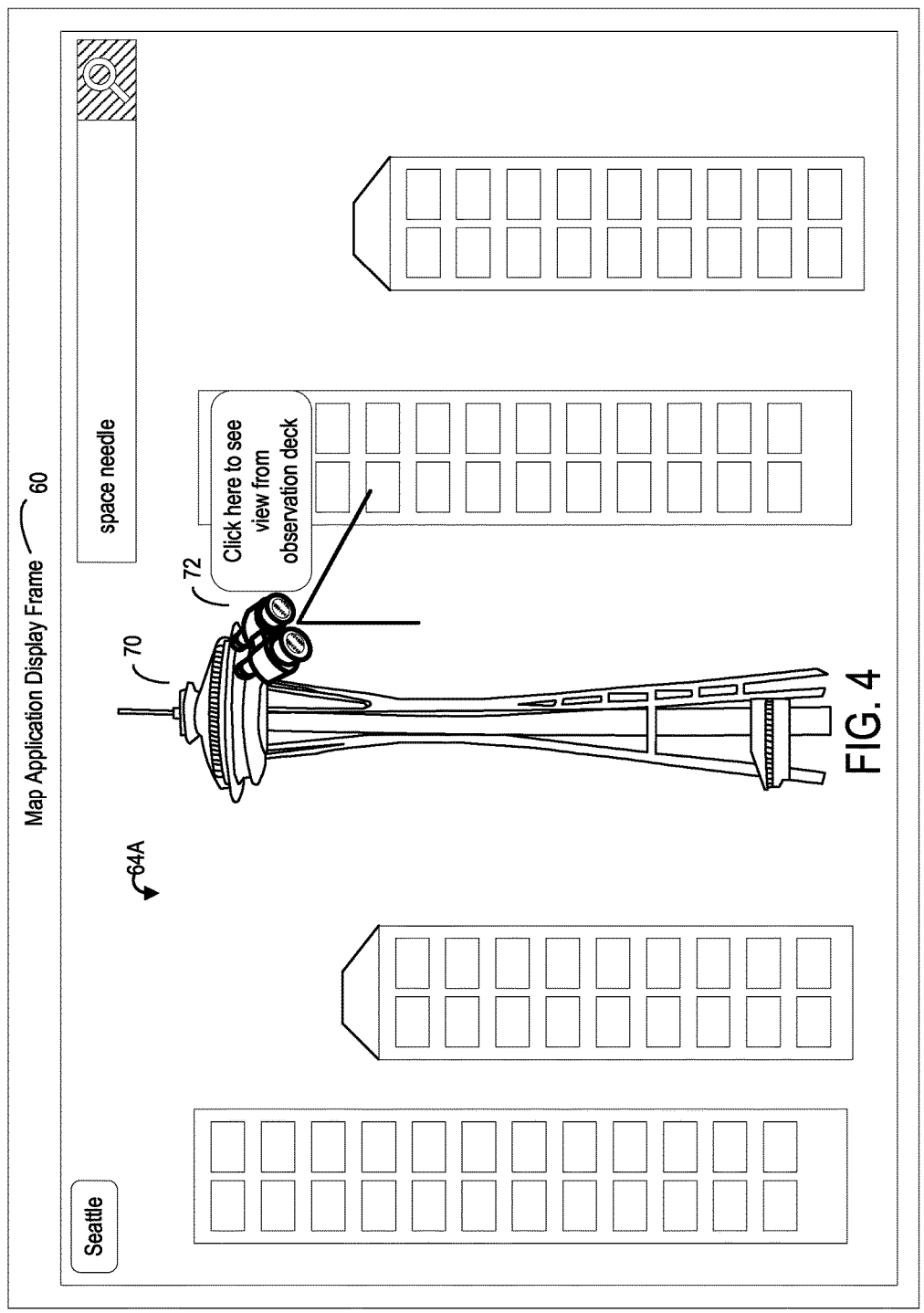
FIG. 4 shows an example interface of the mapping application of FIG. 1.

Now turning to FIG. 4, the three dimensional scene 64A is a virtual representation of Seattle, including buildings and the Space Needle as a point of interest 70. It will be appreciated that Seattle is an example area of interest and the Space Needle is an example point of interest, and are only used for illustrative purposes in this specific example. The user of computing device 12 may view the three dimensional scene 64A via the mapping application 34 being presented on display 26, from virtually any suitable location and orientation. For example, the user may desire to see what a view of Seattle looks like from the observation deck of the Space Needle. Accordingly, a view of the three dimensional scene 64A from the location and orientation of the observation deck of the virtual Space Needle may be displayed to the user.

In one embodiment of the mapping application 34 described above, the viewpoint of the three dimensional scene 64A from the point of interest 70 may be predetermined and stored, either at the client viewpoint library 50 on the user's computing device 12 or on the server viewpoint library 52 on server 14. For example, the path-linked viewpoints 56 may be a plurality of predetermined viewpoints located around the point of interest 70, and may be stored on the user's computing device 12 or the server 14. Accordingly, a set of desirable viewpoints for a point of interest, such as the Space Needle, may be curated and stored for later consumption by a user.

In the above embodiment, the computing device 12 of the user may display an entry point 46 that includes a link to a view 58 of a three dimensional scene 64A from a point of interest 70. In the example illustrated in FIG. 4, the entry point 46 is mapping application entry point 44 which may take the form of an icon 72 displayed at the point of interest 70 within the mapping application display frame 60 of mapping application 34. In this example, the user may select the entry point 46 via clicking the icon 72 with a mouse.

However, it will be appreciated that any suitable user input device 22 and associated user input method may be used to select the entry point 46.

Figure 5:
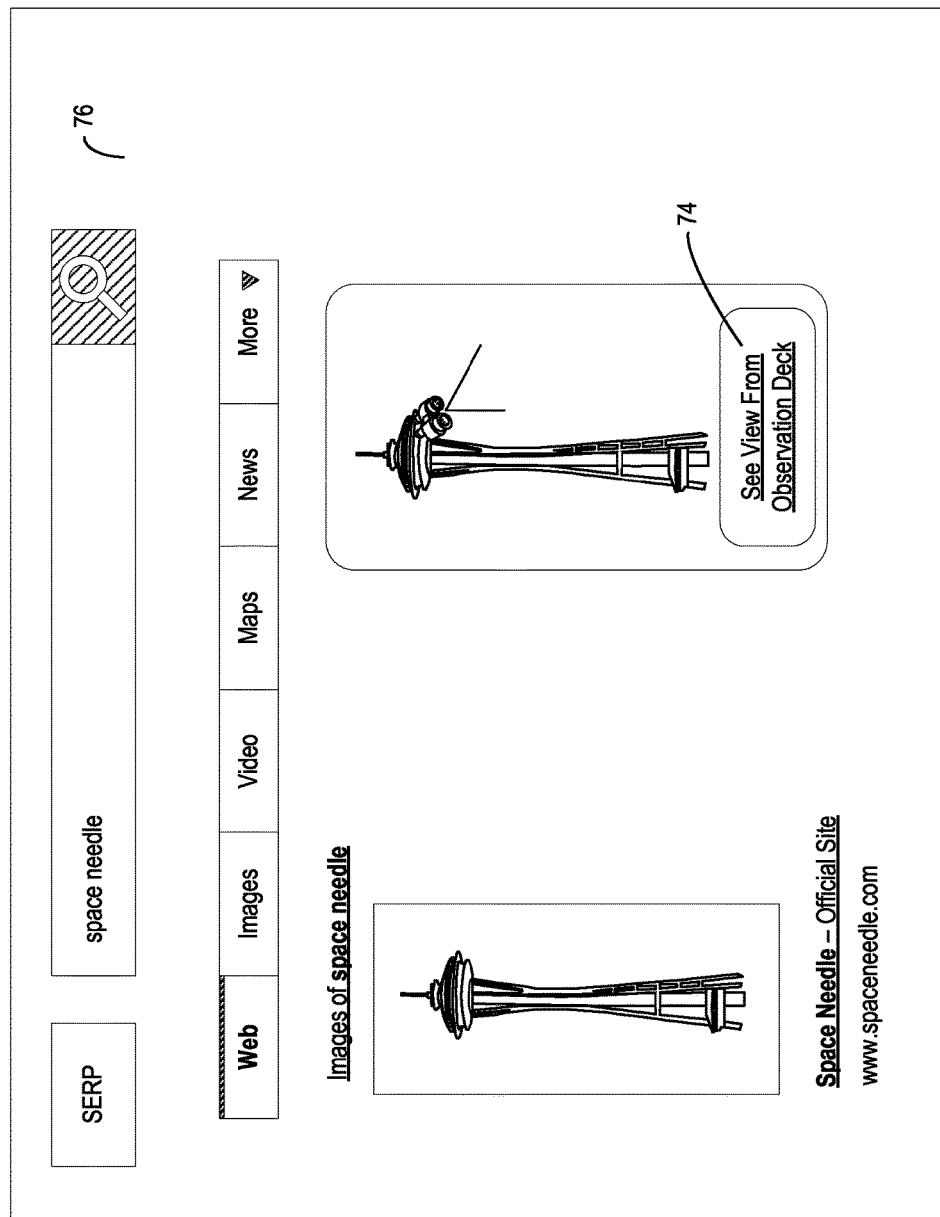
FIG. 5 shows an example search engine results page displayed in a browser, which includes the browser entry point of FIG. 1.

FIG. 5 illustrates an example wherein the entry point 46 is the browser entry point 40, which takes the form of a hyper link 74 displayed on a search engine results page 76 with browser 36. The hyper link 74 may be selected via clicking the link 74 with a mouse, however it will be appreciated that other input methods and input devices 22 are possible. It will be further appreciated that the browser entry point 40 may take many forms, such as a virtual button for example.

After the user's computing device 12 receives, via the user input device 22, a selection of the entry point 46 from the user, the computing device 12 retrieves a predetermined path of a plurality of predetermined viewpoints located around the point of interest. In one embodiment, the computing device 12 retrieves the predetermined path of the plurality of predetermined viewpoints from the server 14. In another embodiment, the predetermined path of a plurality of predetermined viewpoints is stored in the non-volatile storage device 24 of the computing device 12 at the client viewpoint library 50.

Figure 6:
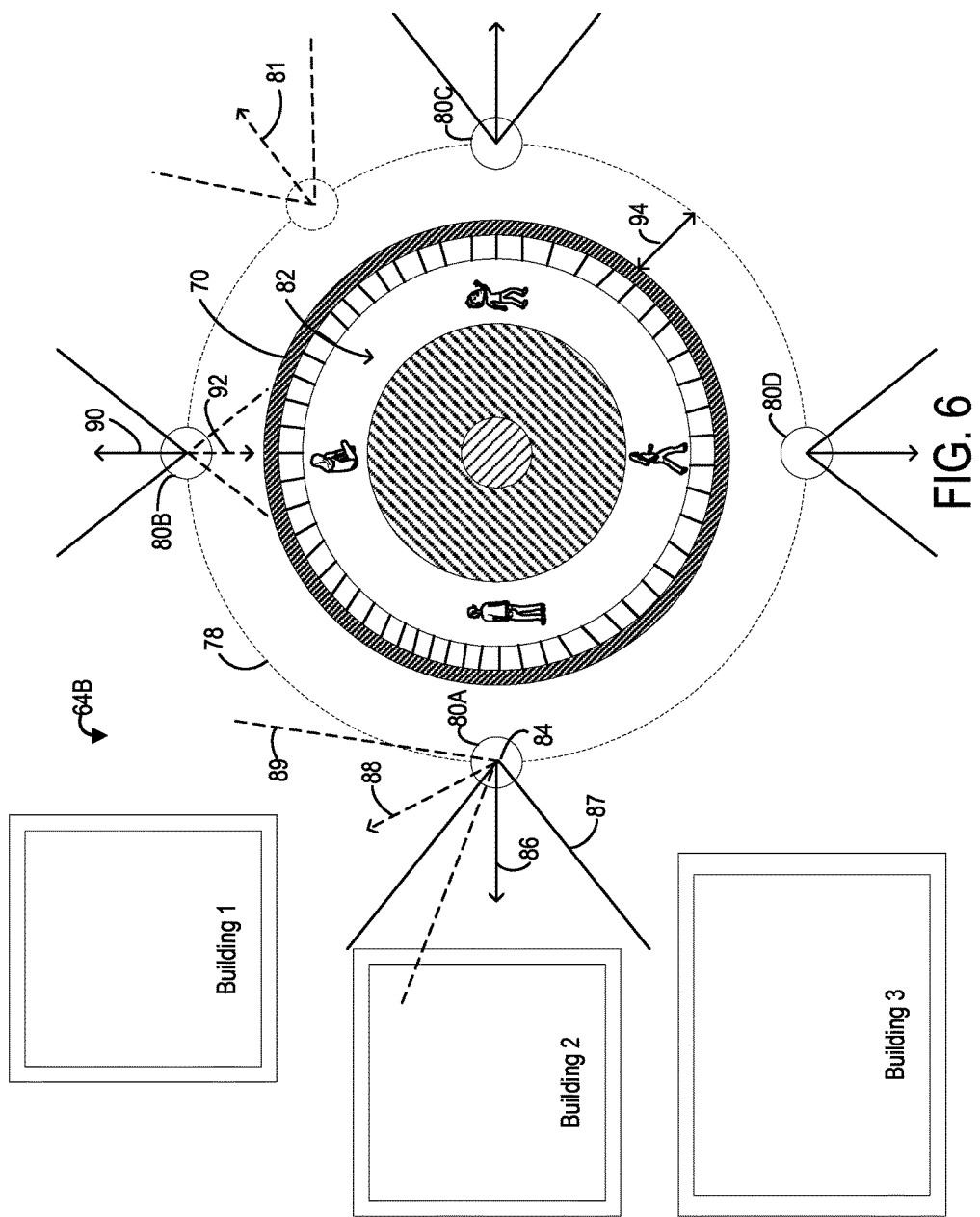
FIG. 6 shows an overhead view of a plurality of predetermined viewpoints around a point of interest in the mapping application of FIG. 1.

FIG. 6 illustrates an example predetermined path 78 of a plurality of predetermined viewpoints 80A-D located in the vicinity of the point of interest 70. In the specific example shown in FIG. 6, the point of interest 70 is the Space Needle, and the plurality of predetermined viewpoints 80A-D are selected to show a view of the three dimensional scene 64B from the perspective of the observation deck 82 of the Space Needle. It will be appreciated that the predetermined viewpoints 80A-D may be selected based on any other suitable criteria, such as to showcase novel viewpoints from the point of interest 70 that a person at the real world point of interest would not physically be able to see. In the above example, the plurality of viewpoints 80A-D may be selected to be around the top of the Space Needle, where visitors of the actual Space Needle would not physically be able to stand. Thus, the plurality of predetermined viewpoints 80A-D may be selected to fulfill any desirable criteria, such as to represent the view offered to visitors of the point of interest in the real world, or to showcase novel views that would not normally be physically possible to be viewed by a visitor of the point of interest in the real world. It will also be appreciated that although FIG. 6 illustrates the plurality of predetermined viewpoints 80A-D as having four predetermined viewpoints, the plurality of predetermined viewpoints may include any number of predetermined viewpoints.

In one example, each predetermined viewpoint may specify a location in the three dimensional scene 64B, as well as a particular orientation in the three dimensional scene 64B. As illustrated in FIG. 6, the predetermined viewpoint 80A may include a location 84 and a first view orientation 86, which is a vector in the three dimensional scene 64B. In the above example, the first view orientation 86 of the predetermined viewpoint may specify an initial view orientation that is displayed to the user. Accordingly, with the location 84 and the view orientation 86, a view of the three dimensional scene 84B may be rendered having a field of view 87. It will be appreciated that the field of view 87 may be adjusted based on a desired resolution, and/or other criteria.

As discussed above, any novel viewpoints of the three dimensional 64B may be generated from any arbitrary location and view orientation. Accordingly, this embodiment may also include a function for the user to pan to a different view orientation while maintaining the current view location. In the example illustrated in FIG. 6, the predetermined viewpoint 80A may be displayed to the user as having the location 84 as well as the first view orientation 86. Next, through a panning function, the user may shift the view orientation from the first view orientation 86 to a second view orientation 88, and a new view of the three dimensional scene 64B may be generated and displayed to the user on display 26 of computing device 12. Similarly as discussed above, the new view of the three dimensional scene 64 may be rendered with having a field of view 89, based on the location 84 and the second view orientation 88. It will be appreciated that while two view orientations are depicted in FIG. 6 for the predetermined viewpoint 80A, any number of view orientations are possible.

In one embodiment, the view orientations that the user may pan to at each predetermined viewpoint may be unrestricted. That is, the user may pan to all possible view orientations from the location of the predetermined viewpoint. In another embodiment, it may be desirable to restrict the view orientations that may be panned to by the user. In the example illustrated in FIG. 6, the predetermined viewpoint 80B may be displayed to the user as initially having a view orientation 90. In this embodiment, the user may be restricted from panning to the restricted view orientation 92, because this restricted view orientation may have an undesirable (or non-existent) view of the point of interest 70, for example it will be appreciated that because the point of interest 70 includes a mesh, it is possible that certain view orientations from a location near the point of interest 70 may clip the mesh, causing an undesirable view to be displayed to the user. Thus, in one embodiment, the view orientation displayed to the user is constrained to face a predetermined direction, such as outward from the point of interest. That is, the view orientations that may be panned to by the user are restricted to only those view orientations that face outward from the point of interest 70. Typically the outward orientation is set to be normal to the predetermined path. It will be appreciated that the above criteria is one specific criteria that may be used to constrain the view displayed to the user, and that any suitable criteria may be used.

In one embodiment, the predetermined path sequentially links each predetermined viewpoint in the plurality of predetermined viewpoints. In the example illustrated in FIG. 6, the predetermined path 78 sequentially links the plurality of predetermined viewpoints 80A-D in a path around the point of interest 70. In this embodiment, the predetermined path 78 may sequentially link each predetermined viewpoint such that when the user enters an input to scroll to a next location, the computing device 12 displays the view of the next predetermined viewpoint linked to a currently viewed predetermined viewpoint on the predetermined path 78. In the example illustrated in FIG. 6, if the user is currently viewing the three dimensional scene 64B from the predetermined viewpoint 80A, then upon entering an input to scroll to the next location, the computing system displays the view of the three dimensional scene 64B from the next predetermined viewpoint on the predetermined path 80, which is predetermined viewpoint 80B.

It will be appreciated that other forms of the predetermined path are possible. For example, the predetermined path 78 may have a branching or web structure, such that a predetermined viewpoint may be linked to two or more other predetermined viewpoints of the plurality of predetermined viewpoints. Accordingly, the user may additionally enter an input to choose which branch of the predetermined path to proceed along.

In another embodiment, the predetermined path 78 may sequentially link each predetermined viewpoint such that when the user enters an input to scroll to the next location, the computing system displays the view of an intermediate viewpoint with a location on the predetermined path that is between two predetermined viewpoints of the plurality of predetermined viewpoints. In the example illustrated in FIG. 6, if the user is currently viewing the three dimensional scene 34B from the predetermined viewpoint 80B, then upon entering an input to scroll to the next location, the computing system displays a view of the three dimensional scene 64B from an intermediate viewpoint 81 that is located on the predetermined path 78 in between the predetermined viewpoint 80B and the predetermined viewpoint 80C. It will be appreciated that while intermediate viewpoint 81 is illustrated as being located roughly halfway in between predetermined viewpoints 80B and 80C, intermediate viewpoint 80 may be located at any position on the predetermined viewpoint 78 that is in between the two predetermined viewpoints.

Additionally, although FIG. 6 illustrates only one intermediate viewpoint 81, there may be any suitable number of intermediate viewpoints in between each pair of predetermined viewpoints on the predetermined path 78. In this embodiment, by increasing the number of intermediate viewpoints, the distance between each intermediate viewpoint on the predetermined path 78 may be reduced. Thus, by reducing the distance skipped between each intermediate viewpoint on the predetermined path 78 to below a suitable threshold value, such as 1 pixel in screen space, the user will perceive that the displayed view of the three dimensional scene 64B is continuously scrolling along the predetermined path 78 as the user continually enters the input to scroll to the next location. It will be appreciated that because a view of the three dimensional scene 64B may be generated for any arbitrary location and view orientation, the intermediate viewpoints along the predetermined path 78 do not need to be pre-stored in memory and retrieved by the computing device 12. Accordingly, in one embodiment, upon the user entering the input to scroll to the next location, the computing device 12 may determine the location of the next intermediate viewpoint by determining a position on the predetermined path 78 that is a suitable distance away from a current viewpoint on the predetermined path 78. A view of the three dimensional scene 64B from the intermediate viewpoint at the determined position on the predetermined path 78 may then be generated by the computing system and displayed to the user.

In one embodiment, the predetermined path may be programmatically generated based on the plurality of predetermined viewpoints. In the example illustrated in FIG. 6, a curator user may select the plurality of predetermined viewpoints 80A-D, via curator computing system 54 and stored at server viewpoint library 52 of server 14. After retrieving the predetermined viewpoints 80A-D, the computing device 12 or server 14 may programmatically generate the predetermined path 78 based on the selected plurality of predetermined viewpoints 80A-D. As discussed above, the predetermined path 78 may be programmatically generated to have a variety of forms. For example, as illustrated in FIG. 6, the predetermined path 78 may be programmatically generated to sequentially link the plurality of predetermined viewpoints 80A-D in a loop structure around the point of interest 70.

In this embodiment, the predetermined path may be further programmatically generated such that the predetermined path 78 is at least a threshold distance 84 away from the point of interest 70 at all locations along the predetermine path 78. It will be appreciated that the mesh of the point of interest 70 may not be smooth, and may include protrusions along the surface of the mesh that may extend into the predetermined path 78, and thus may cause visual artifacts to appear in the view of the three dimensional scene 64B that is generated and displayed to the user. Accordingly, the threshold distance may be determined such that no protrusions of the mesh of the point of interest 70 extend into the programmatically generated predetermined path 78.

Accordingly, the predetermined path 78 may be generated such that the predetermined path 78 sequentially links each predetermined viewpoint in the plurality of predetermined viewpoints. The predetermined path 78 may also be generated such that the predetermined path 78 is at least a threshold distance away from the point of interest at all locations along the predetermined path.

Figure 7:
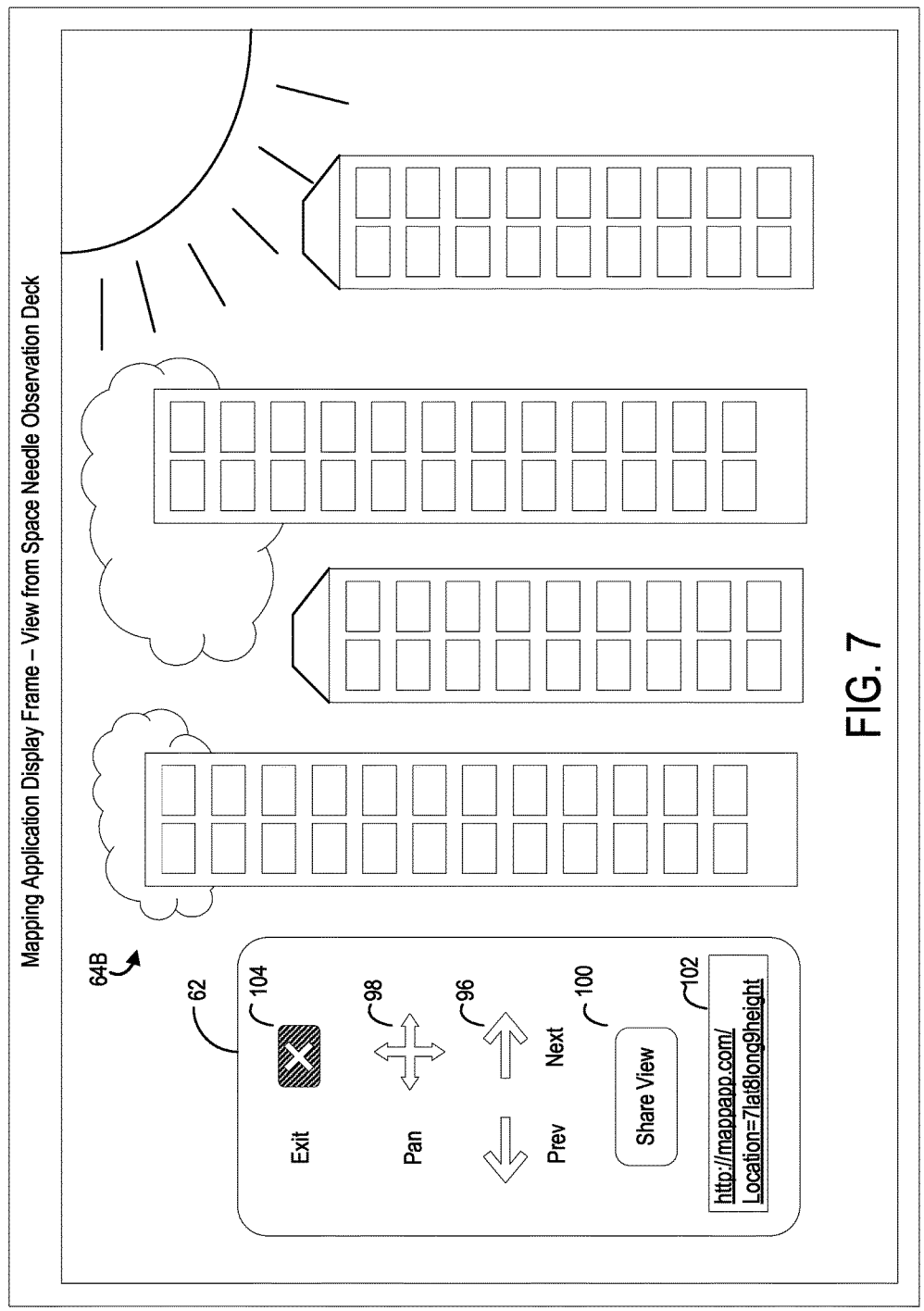
FIG. 7 shows a view of the three dimensional scene from a predetermined viewpoint of FIG. 1.

Now turning to FIG. 7, an example current view of the three dimensional scene 64B is illustrated. The current view is a rendering of the three dimensional scene 64B from a first predetermined viewpoint in the plurality of predetermined viewpoints having an associated location, orientation, and field of view in the three dimensional scene 64B. In this example, the first predetermined viewpoint may be an initial predetermined viewpoint in the predetermined path that is retrieved by the computing device 12. As illustrated, an interaction interface 62 may also be displayed, the interaction interface 62 being a graphical user interface that is overlaid on top of the displayed view in the mapping application display frame 60. In one embodiment, the interaction interface 62 may include a control 96 to scroll along the predetermined path to a next location on the predetermined path. As discussed above, the next location may be an intermediate viewpoint or another predetermined viewpoint in the plurality of predetermined viewpoints. In the embodiment that includes intermediate viewpoints, selecting the control 96 may cause the displayed view to appear to the user as continuously scrolling along the predetermined path. It will be appreciated that control 96 may be selected by the user through a variety of methods. As a few non-limiting examples, control 96 may be selected by clicking the control on the interaction interface, pressing an arrow key on a keyboard, tracking a hand gesture on a touch screen, or receiving a voice command via a microphone. Additionally, although the control 96 is illustrated in FIG. 7 as having an arrow key form, it will be appreciated that the control 96 may take any suitable form. For example, the control 96 may take the form of a slider, a visual icon to indicate a suitable hand gesture to active the control, a voice prompt to indicate a suitable voice command to active the control, a selectable text element, or other suitable form.

As illustrated in FIG. 7, the interaction interface 62 may include additional controls. In the illustrated example, the interaction interface 62 further includes a second control 98 to pan through a plurality of view orientations. The interaction interface may additionally include a third control 100 to generate a sharable link 104 that anchors to a current view of the three dimensional scene being displayed to the user, such that the current view of the three dimensional scene is displayed to a second user of a second computing device upon selection of the shareable link by the second user. In one embodiment, the shareable link may include location and orientation data in the link itself that the second computing system of the second user may use to render and display a new rendered view of the three dimensional scene. Thus, as the new rendered view of the three dimensional scene was generated from the same location and orientation in the three dimensional scene as the current view for the first user, the new rendered view displayed to the second user will be the same as the current view displayed to the first user. In another embodiment, the shareable link may be a link to a stream of location and orientation data. Accordingly, the view displayed to the second user by the second computing device may be continually updated as the first user of the first computing device 12 scrolls to new locations or pans to new viewing orientations. The interaction interface 62 may also include a fourth control 104 that exits the predetermined path and returns to an unrestricted view of the three dimensional scene 64B in the mapping application 34. As discussed above in regards to control 96, the visual appearances and input methods for the plurality of controls are not limited to the example illustrated in FIG. 7. The plurality of controls may be selected by the user through a variety of suitable input methods and the visual appearances of the plurality of controls on the interaction interface 62 may take a variety of suitable forms, as discussed above.

Figure 8:
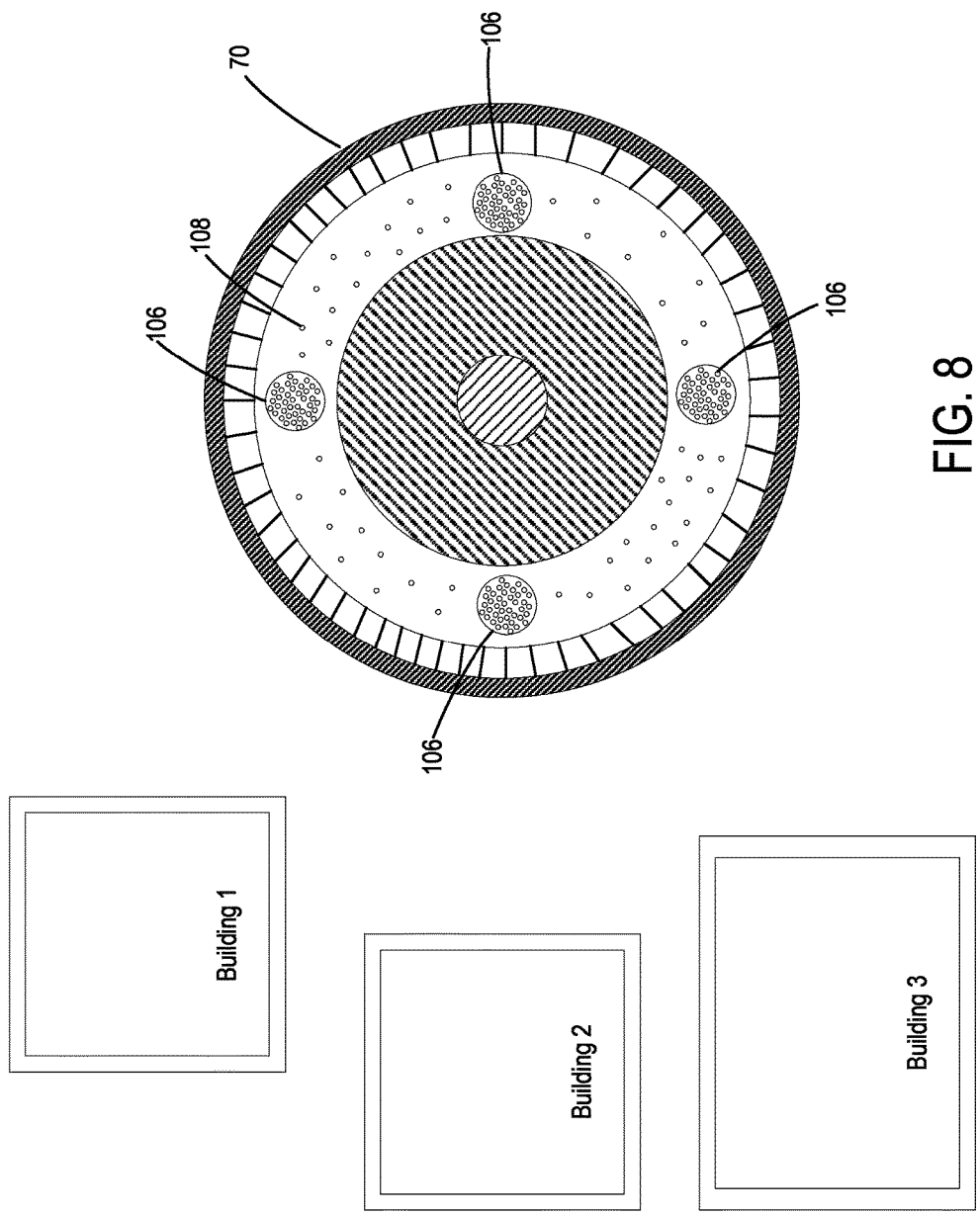
FIG. 8 shows clusters of geolocated activity around the point of interest in the mapping application of FIG. 1.

FIG. 8 illustrates an example wherein the plurality of predetermined viewpoints are clusters 106 of geolocated activity 108. For example, the geolocated activity may be a data set of pictures taken by cellphones of visitors of the point of interest 70 in the real world, the cellphones tagging the pictures with a geolocation at the time that the picture was taken. The data set may be analyzed to determine clusters of pictures that were taken at similar geolocations. Thus, these clusters 106 may represent the locations or viewpoints around the point of interest 70 that have the most desirable view of the area of interest surrounding the point of interest 70. Accordingly, these clusters 106 of geolocated activity 108 may be used to select the plurality of predetermined viewpoints around the point of interest 70.

Figure 9:
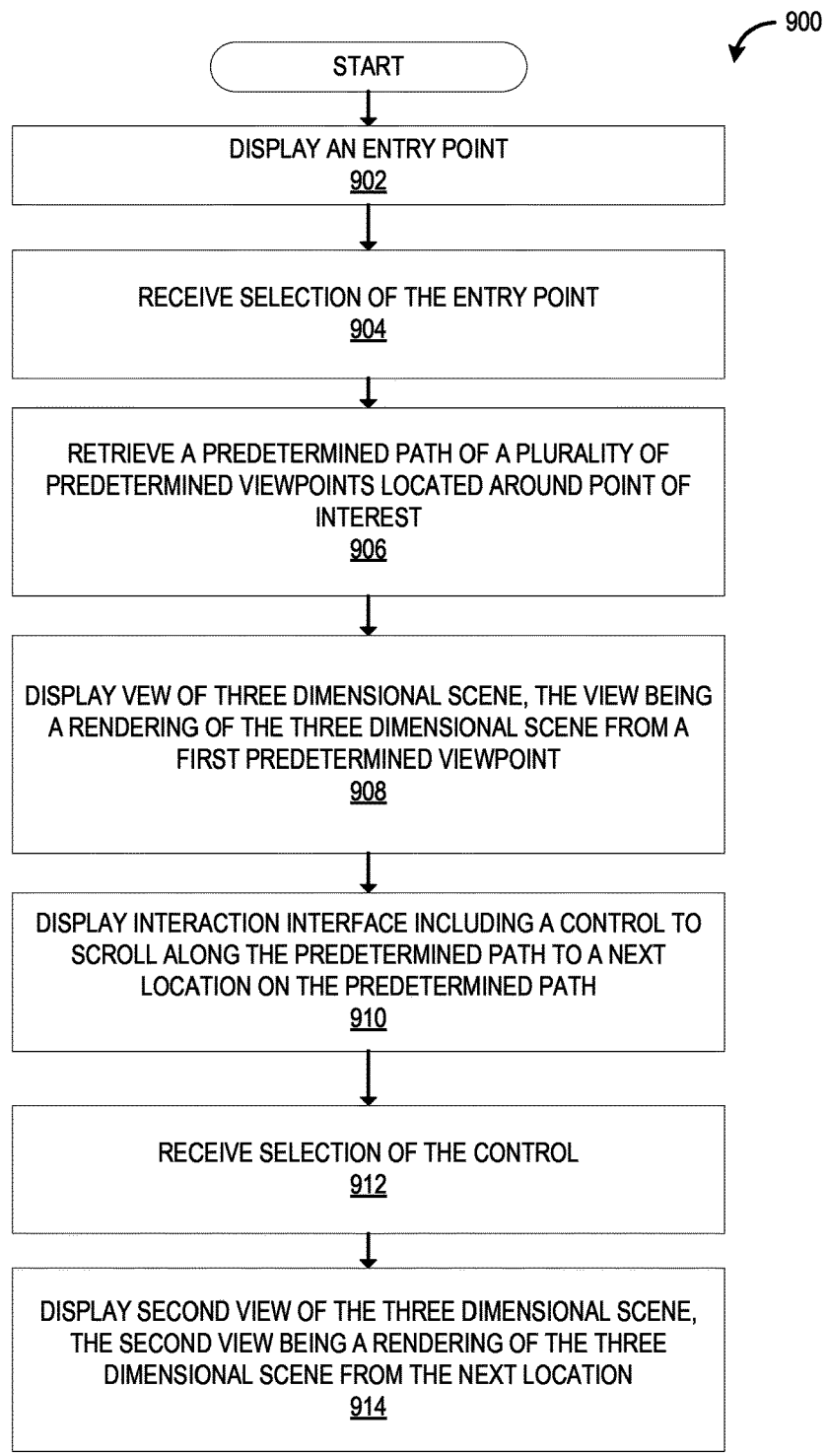
FIG. 9 shows a method for presenting path-linked viewpoints from a point of interest according to an embodiment of the present description.

FIG. 9 is a flow chart of a method 900 for presenting path-linked viewpoints from a point of interest according to an embodiment of the present description. At step 902, the method 900 may include displaying an entry point that includes a link to a view of a three dimensional scene from a point of interest. In one embodiment, the entry point is a link displayed on a search engine results page. In another embodiment, the entry point is an icon displayed at the point of interest within a three dimensional mapping application.

Advancing from step 902 to step 904, the method 900 may include receiving a selection of the entry point from a user. It will be appreciated that the user may select the entry point through a variety of input methods. For example, the user may click the link or icon, the user may press a corresponding key on a keyboard, or the user may select the entry point through a voice command.

Proceeding from step 904 to step 906, the method 900 may include retrieving a predetermined path of a plurality of predetermined viewpoints located around the point of interest. In one embodiment, the predetermined path sequentially links each predetermined viewpoint in the plurality of predetermined viewpoints. In another embodiment, the predetermined path has a branching or web structure, such that each predetermined viewpoint may be linked to multiple other predetermined viewpoints in the plurality of predetermined viewpoints. In another embodiment, the predetermined path is at least a threshold distance away from the point of interest at all locations along the predetermined path. In another embodiment, the plurality of predetermined viewpoints are clusters of geolocated user activity.

Advancing from step 906 to step 908, the method 900 may include displaying the view of the three dimensional scene, the view being a rendering of the three dimensional scene from a first predetermined viewpoint of the plurality of predetermined viewpoints.

Proceeding from step 908 to step 910, the method 900 may include displaying an interaction interface including a control to scroll along the predetermined path to a next location on the predetermined path. In one embodiment, the control continuously scrolls along the predetermined path, such that the next location is an intermediate viewpoint with a location on the predetermined path that is between two predetermined viewpoints of the plurality of predetermined viewpoints. In another embodiment, the interaction interface further includes a second control to pan through a plurality of view orientations. In this embodiment, the view orientation displayed to the user may be constrained to face outward from the point of interest.

Advancing from step 910 to step 912, the method 900 may include receiving a selection of the control by the user. It will be appreciated that the user may select the control through a variety of methods. For example, the user may click on the control via a mouse, press a corresponding key on a keyboard, or select the control via a voice input.

Proceeding from step 914 to step 916, the method 900 may include displaying a second view of the three dimensional scene, the second view being a rendering of the three dimensional scene from the next location.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
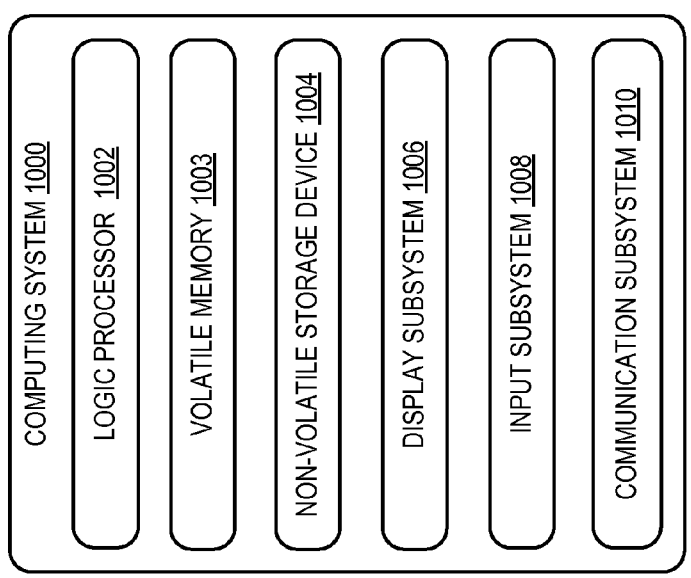
FIG. 10 shows an example computing device that may be utilized by the computing system of FIG. 1 or method of FIG. 9.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. For example, computing system 1000 may include computing device 12 and server 14.

Computing system 1000 includes a logic processor 1002, volatile memory 1003, and a non-volatile storage device 1004. Computing system 1000 may optionally include a display subsystem 1006, input subsystem 1008, communication subsystem 1020, and/or other components not shown in FIG. 10.

Logic processor 1002 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1004 includes one or more physical devices configured to hold instructions executable by the logic processors to implement the methods and processes described herein. When such methods and processes are implemented, the state of non-volatile storage device 1004 may be transformed—e.g., to hold different data.

Non-volatile storage device 1004 may include physical devices that are removable and/or built-in. Non-volatile storage device 1004 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1004 may include nonvolatile, dynamic, static, read/write, read-only, sequential-access, location-addressable, file-addressable, and/or content-addressable devices. It will be appreciated that non-volatile storage device 1004 is configured to hold instructions even when power is cut to the non-volatile storage device 1004.

Volatile memory 1003 may include physical devices that include random access memory. Volatile memory 1003 is typically utilized by logic processor 1002 to temporarily store information during processing of software instructions. It will be appreciated that volatile memory 1003 typically does not continue to store instructions when power is cut to the volatile memory 1003.

Aspects of logic processor 1002, volatile memory 1003, and non-volatile storage device 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic processor 1002 executing instructions held by non-volatile storage device 1004, using portions of volatile memory 1003. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1006 may be used to present a visual representation of data held by non-volatile storage device 1004. This visual representation may take the form of a graphical user interface (GUI). As the herein described methods and processes change the data held by the non-volatile storage device, and thus transform the state of the non-volatile storage device, the state of display subsystem 1006 may likewise be transformed to visually represent changes in the underlying data. Display subsystem 1006 may include one or more display devices utilizing virtually any type of technology. Such display devices may be combined with logic processor 1002, volatile memory 1003, and/or non-volatile storage device 1004 in a shared enclosure, or such display devices may be peripheral display devices.

When included, input subsystem 1006 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs provide additional support for the claims of the subject application. One aspect provides a computing system for displaying path-linked viewpoints from a point of interest comprising a display for displaying images to a user, a user input device that receives input from the user, and a processor configured to: display an entry point that includes a link to a view of a three dimensional scene from a point of interest, receive, via the user input device, a selection of the entry point from the user, retrieve a predetermined path of a plurality of predetermined viewpoints located around the point of interest, display the view of the three dimensional scene, the view being a rendering of the three dimensional scene from a first predetermined viewpoint in the plurality of predetermined viewpoints, display an interaction interface including a control to scroll along the predetermined path to a next location on the predetermined path, receive, via the user input device, a selection of the control, and display a second view of the three dimensional scene, the second view being a rendering of the three dimensional scene from the next location. The computing system may additionally or alternatively include, wherein the predetermined path sequentially links each predetermined viewpoint in the plurality of predetermined viewpoints. The computing system may additionally or alternatively include, wherein the control continuously scrolls along the predetermined path, such that the next location is an intermediate viewpoint with a location on the predetermined path that is between two predetermined viewpoints of the plurality of predetermined viewpoints. The computing system may additionally or alternatively include, wherein the predetermined path is at least a threshold distance away from the point of interest at all locations along the predetermined path. The computing system may additionally or alternatively include, wherein the plurality of predetermined viewpoints are clusters of geolocated user activity. The computing system may additionally or alternatively include, wherein the interaction interface further includes a second control to pan through a plurality of view orientations. The computing system may additionally or alternatively include, wherein the view orientation displayed to the user is constrained to face outward from the point of interest. The computing system may additionally or alternatively include, wherein the entry point is a link displayed on a search engine results page. The computing system may additionally or alternatively include, wherein the entry point is an icon displayed at the point of interest within a three dimensional mapping application. The computing system may additionally or alternatively include, wherein the interaction interface further includes a third control to generate a sharable link that anchors to a current view of the three dimensional scene being displayed to the user, such that the current view of the three dimensional scene is displayed to a second user of a second computing system upon selection of the shareable link by the second user.

Another aspect provides a method for displaying path-linked viewpoints from a point of interest comprising displaying an entry point that includes a link to a view of a three dimensional scene from a point of interest, receiving a selection of the entry point from a user, retrieving a predetermined path of a plurality of predetermined viewpoints located around the point of interest, displaying the view of the three dimensional scene, the view being a rendering of the three dimensional scene from a first predetermined viewpoint in the plurality of predetermined viewpoints, displaying an interaction interface including a control to scroll along the predetermined path to a next location on the predetermined path, receiving a selection of the control by the user, and displaying a second view of the three dimensional scene, the second view being a rendering of the three dimensional scene from the next location. The method may additionally or alternatively include, wherein the predetermined path sequentially links each predetermined viewpoint in the plurality of predetermined viewpoints. The method may additionally or alternatively include, wherein the control continuously scrolls along the predetermined path, such that the next location is an intermediate viewpoint with a location on the predetermined path that is between two predetermined viewpoints of the plurality of predetermined viewpoints. The method may additionally or alternatively include, wherein the predetermined path is at least a threshold distance away from the point of interest at all locations along the predetermined path. The method may additionally or alternatively include, wherein the plurality of predetermined viewpoints are clusters of geolocated user activity. The method may additionally or alternatively include, wherein the interaction interface further includes a second control to pan through a plurality of view orientations. The method may additionally or alternatively include, wherein the view orientation displayed to the user is constrained to face outward from the point of interest. The method may additionally or alternatively include, wherein the entry point is a link displayed on a search engine results page. The method may additionally or alternatively include, wherein the entry point is an icon displayed at the point of interest within a three dimensional mapping application.

Another aspect provides a computing system for displaying path-linked viewpoints from a point of interest comprising a display for displaying images to a user, a user input device that receives input from the user, and a processor configured to: display an entry point that includes a link to a view of a three dimensional scene from a point of interest, receive, via the user input device, a selection of the entry point from the user, retrieve a predetermined path of a plurality of predetermined viewpoints located around the point of interest, the predetermined path linking each predetermined viewpoint in the plurality of predetermined viewpoints and being at least a threshold distance away from the point of interest at all locations along the predetermined path, display the view of the three dimensional scene, the view being a rendering of the three dimensional scene from a first predetermined viewpoint in the plurality of predetermined viewpoints, display an interaction interface including a control to continuously scroll along the predetermined path to a next location on the predetermined path, such that the next location is an intermediate viewpoint with a location on the predetermined path that is between two predetermined viewpoints of the plurality of predetermined viewpoints, receive, via the user input device, a selection of the control, and display a second view of the three dimensional scene, the second view being a rendering of the three dimensional scene from the next location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system for displaying path-linked viewpoints from a point of interest comprising:
   a display for displaying images to a user;
   a user input device that receives input from the user; and
   a processor configured to:
      display an entry point that includes a link to a view of a three dimensional scene from a point of interest, the three dimensional scene including virtual objects that are virtual representations of real objects of a real world scene;
      receive, via the user input device, a selection of the entry point from the user;
      retrieve a predetermined path of a plurality of predetermined viewpoints located around the point of interest, wherein the predetermined path was generated to be located at least a threshold distance away from the point of interest at all locations along the predetermined path;
      display the view of the three dimensional scene, the view being a rendering of the three dimensional scene including rendered views of the virtual objects from a first predetermined viewpoint in the plurality of predetermined viewpoints;
      display an interaction interface including a control to scroll along the predetermined path to a next location on the predetermined path;
      receive, via the user input device, a selection of the control; and display a second view of the three dimensional scene, the second view being a rendering of the three dimensional scene including rendered views of the virtual objects from the next location.

2. The computing system of claim 1, wherein the predetermined path sequentially links each predetermined viewpoint in the plurality of predetermined viewpoints.

3. The computing systems of claim 2, wherein the control continuously scrolls along the predetermined path, such that the next location is an intermediate viewpoint with a location on the predetermined path that is between two predetermined viewpoints of the plurality of predetermined viewpoints.

4. The computing system of claim 1, wherein the plurality of predetermined viewpoints are clusters of geolocated user activity.

5. The computing system of claim 1, wherein the interaction interface further includes a second control to pan through a plurality of view orientations.

6. The computing system of claim 5, wherein the view orientation displayed to the user is constrained to face outward from the point of interest.

7. The computing system of claim 1, wherein the entry point is a link displayed on a search engine results page.

8. The computing system of claim 1, wherein the entry point is an icon displayed at the point of interest within a three dimensional mapping application.

9. The computing system of claim 1, wherein the interaction interface further includes a third control to generate a sharable link that anchors to a current view of the three dimensional scene being displayed to the user, such that the current view of the three dimensional scene is displayed to a second user of a second computing system upon selection of the shareable link by the second user.

10. A method for displaying path-linked viewpoints from a point of interest performed by one or more processors of a computing system executing instructions held in a storage device, the method comprising:
displaying an entry point that includes a link to a view of a three dimensional scene from a point of interest via a display of the computing system, the three dimensional scene including virtual objects that are virtual representations of real objects of a real world scene;
receiving a selection of the entry point from a user via an input device of the computing system;
retrieving a predetermined path of a plurality of predetermined viewpoints located around the point of interest, wherein the predetermined path was generated to be located at least a threshold distance away from the point of interest at all locations along the predetermined path;
displaying the view of the three dimensional scene via the display of the computing system, the view being a rendering of the three dimensional scene including rendered views of the virtual objects from a first predetermined viewpoint in the plurality of predetermined viewpoints;
displaying an interaction interface including a control to scroll along the predetermined path to a next location on the predetermined path via the display of the computing system;
receiving a selection of the control by the user via the input device of the computing system; and
displaying a second view of the three dimensional scene via the display device of the computing system, the second view being a rendering of the three dimensional scene including rendered views of the virtual objects from the next location.

11. The method of claim 10, wherein the predetermined path sequentially links each predetermined viewpoint in the plurality of predetermined viewpoints.

12. The method of claim 11, wherein the control continuously scrolls along the predetermined path, such that the next location is an intermediate viewpoint with a location on the predetermined path that is between two predetermined viewpoints of the plurality of predetermined viewpoints.

13. The method of claim 10, wherein the plurality of predetermined viewpoints are clusters of geolocated user activity.

14. The method of claim 10, wherein the interaction interface further includes a second control to pan through a plurality of view orientations.

15. The method of claim 14, wherein the view orientation displayed to the user is constrained to face outward from the point of interest.

16. The method of claim 10, wherein the entry point is a link displayed on a search engine results page.

17. The method of claim 10, wherein the entry point is an icon displayed at the point of interest within a three dimensional mapping application.

18. A computing system for displaying path-linked viewpoints from a point of interest comprising:
a display for displaying images to a user;
a user input device that receives input from the user; and
a processor configured to:
display an entry point that includes a link to a view of a three dimensional scene from a point of interest, the three dimensional scene including virtual objects that are virtual representations of real objects of a real world scene;
receive, via the user input device, a selection of the entry point from the user;
retrieve a predetermined path of a plurality of predetermined viewpoints located around the point of interest, the predetermined path linking each predetermined viewpoint in the plurality of predetermined viewpoints and was generated to be located at least a threshold distance away from the point of interest at all locations along the predetermined path;
display the view of the three dimensional scene, the view being a rendering of the three dimensional scene including rendered views of the virtual objects from a first predetermined viewpoint in the plurality of predetermined viewpoints;
display an interaction interface including a control to continuously scroll along the predetermined path to a next location on the predetermined path, such that the next location is an intermediate viewpoint with a location on the predetermined path that is between two predetermined viewpoints of the plurality of predetermined viewpoints;
receive, via the user input device, a selection of the control; and
display a second view of the three dimensional scene, the second view being a rendering of the three dimensional scene including rendered views of the virtual objects from the next location.

* * * * *